UNITED STATES PATENT OFFICE.

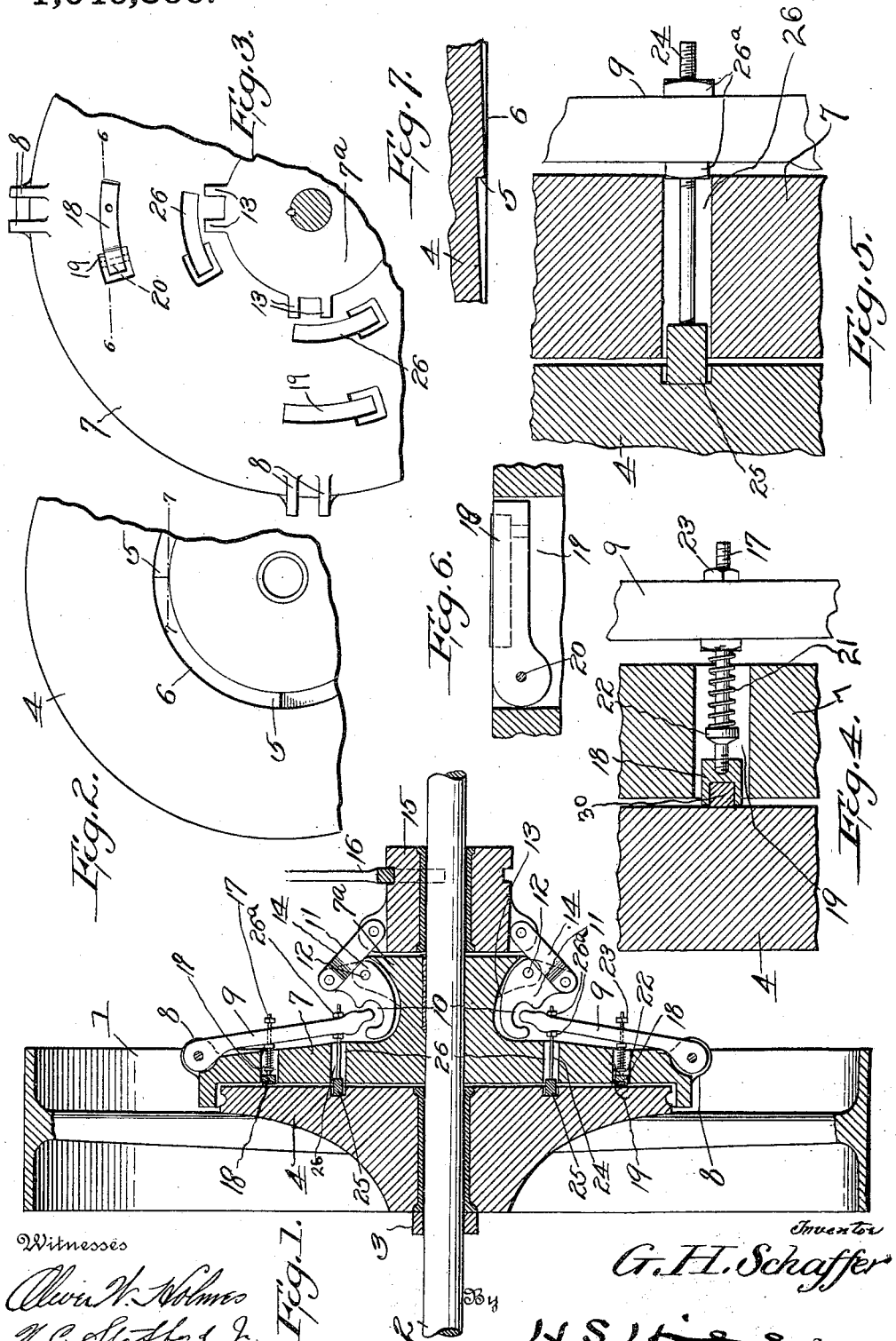

GEORGE H. SCHAFFER, OF STILES, PENNSYLVANIA.

CLUTCH.

1,046,866.  Specification of Letters Patent.  Patented Dec. 10, 1912.

Application filed December 27, 1911. Serial No. 668,167.

*To all whom it may concern:*

Be it known that I, GEORGE H. SCHAFFER, a citizen of the United States, residing at Stiles, in the county of Lehigh and State of Pennsylvania, have invented certain new and useful Improvements in Clutches, of which the following is a specification.

The present invention relates to improvements in clutches such as are commonly employed in connection with pulleys, the object of the invention being to provide a clutch of this character which embodies novel features of construction whereby the clutch members may be readily released or locked together without the usual sudden shocks and jars.

A further object of the invention is to provide a clutch mechanism which is comparatively simple and inexpensive in its construction, which can be easily manipulated, and which will lock the members firmly together when thrown into operative position.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a longitudinal sectional view through a clutch mechanism constructed in accordance with the invention. Fig. 2 is a plan view of a portion of the disk member which is rigid with the hub of the pulley. Fig. 3 is a similar view of a portion of the plate or disk which is fixed upon the shaft. Fig. 4 is an enlarged detail sectional view of the friction shoe. Fig. 5 is a similar detail view of the dog. Fig. 6 is an enlarged sectional view on the line 6—6 of Fig. 3, and Fig. 7 is a similar view on the line 7—7 of Fig. 2.

Corresponding and like parts are referred to in the following description and indicated in all the views of the drawing by the same reference characters.

Specifically describing the present embodiment of the invention, the numeral 1 designates a pulley which is loose upon the shaft 2 and is limited in its sliding movement thereon by a set collar 3 which is rigidly applied to the shaft. The hub of the pulley 1 is formed with a disk 4 having a substantially flat outer face. As indicated more clearly in Figs. 1 and 2, this disk is formed with an annular series of inclined teeth 5, the said teeth being preferably located at the base of an annular depression 6 concentric with the shaft 2. A second disk 7 which has an opposed relation to the disk 4 is fixed upon the shaft 2 so as to rotate therewith. This disk 7 is formed with a peripheral lip 8 which extends over the edges of the complemental disk 4, and is also provided at its periphery with the outwardly projecting ears 8 upon which the outer ends of the main levers 9 are mounted. These levers 9 are radially disposed and extend inwardly toward the shaft 2 on the outer side of the disk 7. The inner ends of the levers 9 are loosely received within notches 10 formed in the inwardly projecting arms of bell crank levers 11, the said bell crank levers being pivoted at 12 upon ears 13 projecting from a hub portion 7ª which is formed in connection with the disk 7. The opposite arms of the bell crank levers are connected by the links 14 to a collar 15 which is keyed upon the shaft 1 and is adapted to be moved back and forth in the usual manner by means of an operating lever 16.

Each of the main levers 9 is provided at an intermediate point in the length thereof and at a point toward its outer end with an opening loosely receiving a stem 17, the inner end of the stem being secured to a longitudinally curved friction shoe 18 which is received within a segmental slot 19 in the disk 7. These shoes 18 are recessed to receive friction blocks 30 which project outwardly beyond the faces thereof, and are pivoted at one end to the disk 7, as indicated at 20. A coil spring 21 surrounds each of the stems 17 and is interposed between a shoulder 22 thereon and the lever 9, the outer end of each of the stems being threaded to receive a nut 23. When the levers 9 are forced inwardly, the friction shoes 18 are brought into engagement with the disk 4 of the pulley and held in a yielding engagement therewith by means of the springs 21. The tension in these springs 21 can be conveniently regulated by means of the nuts 23. Each of the levers 9 is also provided at a point toward the inner end thereof with an opening receiving a stem 24 which has the inner end thereof connected to a dog 25. These dogs 25 are pivotally mounted within segmental slots 26 formed in the plate 7, in a manner identical with that previously described in connection with the friction shoes 18, and are adapted to engage the before mentioned teeth 5 to produce a positive lock with the disk 4 of the pulley.

The outer ends of the stems 24 are threaded for the reception of the nuts 26ª which bear against opposite sides of the levers 9 and can be adjusted as desired.

In the operation of the device, when the lever 16 is manipulated to move the collar 15 toward the fixed member or disk 7, the bell crank levers 11 will be swung inwardly through the medium of the links 14 so as to force the main levers 9 toward the outer face of the disk 7. The friction shoes 18 will thereby be forced into engagement with the plate 4 and will engage the same so as to cause the pulley 1 to gradually rotate with the shaft 2. The dogs 25 will then be brought into engagement with the inclined shoulders or teeth 5 so as to produce a positive lock between the fixed member or disk 7 and the loose member or disk 4. The pulley is then securely locked with the shaft so as to rotate therewith. In a reverse manner, when the main lever 16 is manipulated to move the collar 15 away from the fixed member or disk 7, both the friction shoes 18 and the dogs 25 will be thrown into an inoperative position so as to release the disk or loose member 4 and permit the pulley to remain loose upon the shaft.

Having thus described the invention, what I claim as new and desire to secure by Letters Patent, is:—

1. In a clutch, the combination of a shaft, a pulley loose upon the shaft and formed with a disk having shoulders thereon, a fixed member upon the shaft formed with concentric sets of segmental slots, levers pivoted at the periphery of said fixed member, friction shoes pivoted within one set of said segmental slots and having a yielding connection with said levers, said friction shoes being adapted to engage said disk, dogs pivoted within the other set of said segmental slots and having an operative connection with said levers, said dogs being adapted to engage the shoulders on said disk, a slidable member upon the shaft, an operative connection between said slidable member and said levers, whereby the friction shoes and dogs can be thrown into and out of operative position by manipulating the slidable member.

2. In a clutch, the combination of a shaft, a fixed member upon the shaft, a pulley loose upon the shaft, a slidable member upon the shaft, a lever pivoted at the periphery of said fixed member, a shoe pivoted upon the fixed member, an operative connection between the lever and the shoe, a bell crank lever mounted upon said fixed member and having one arm thereof recessed to loosely receive the free end of the before mentioned lever, and a link connecting the opposite arm of said bell crank lever to said slidable member, whereby the lever can be moved to throw the shoe into and out of operative position through the medium of the slidable member.

In testimony whereof I affix my signature in presence of two witnesses.

GEORGE H. SCHAFFER.

Witnesses:
 Thos. G. Graver,
 Chas. G. Remmel.

---

Copies of this patent may be obtained for five cents each, by addressing the "Commissioner of Patents, Washington, D. C."